(12) United States Patent
Beall

(10) Patent No.: US 11,221,059 B2
(45) Date of Patent: Jan. 11, 2022

(54) RAIN CHAIN INSTALLATION KIT

(71) Applicant: Garm Beall, Chatsworth, CA (US)

(72) Inventor: Garm Beall, Chatsworth, CA (US)

( * ) Notice: Subject to any disclaimer, the term of this patent is extended or adjusted under 35 U.S.C. 154(b) by 119 days.

(21) Appl. No.: 16/515,646

(22) Filed: Jul. 18, 2019

(65) Prior Publication Data

US 2021/0018066 A1 Jan. 21, 2021

(51) Int. Cl.
*F16G 13/14* (2006.01)
*E04D 13/064* (2006.01)
*E04D 13/08* (2006.01)
*E04D 13/068* (2006.01)

(52) U.S. Cl.
CPC .......... *F16G 13/14* (2013.01); *E04D 13/068* (2013.01); *E04D 13/0641* (2013.01); *E04D 13/0645* (2013.01); *E04D 13/08* (2013.01)

(58) Field of Classification Search
CPC ......... E04D 2013/0873; E04D 13/0641; F16G 13/14
See application file for complete search history.

(56) References Cited

U.S. PATENT DOCUMENTS

| 5,437,138 | A | * | 8/1995 | Tuohey | E04D 13/064 248/48.2 |
|---|---|---|---|---|---|
| D519,191 | S | * | 4/2006 | Beall | D11/13 |
| D519,600 | S | * | 4/2006 | Beall | D23/200 |
| D547,423 | S | * | 7/2007 | Lindsay | D23/267 |
| D569,488 | S | * | 5/2008 | Lindsay | D23/267 |
| D651,289 | S | * | 12/2011 | Beall | D23/261 |
| D651,294 | S | * | 12/2011 | Beall | D23/267 |
| D651,295 | S | * | 12/2011 | Beall | D23/267 |
| D732,645 | S | * | 6/2015 | Beall | D23/267 |
| D737,414 | S | * | 8/2015 | Beall | D23/267 |
| D782,626 | S | * | 3/2017 | Beall | D23/267 |
| D790,046 | S | * | 6/2017 | Beall | D23/267 |

* cited by examiner

*Primary Examiner* — Gisele D Ford
(74) *Attorney, Agent, or Firm* — Kelly & Kelley, LLP

(57) ABSTRACT

A kit for installing a rain chain to a rain gutter includes a gutter attachment unit having an outlet tube extendable through a drain aperture of the rain gutter. A rain chain support is attachable to the outlet tube and includes a sloped member which aligns and self-centers a rain chain coupled thereto with the outlet tube such that rainwater exiting the outlet tube is directed onto the rain chain.

18 Claims, 6 Drawing Sheets

RAIN CHAIN INSTALLATION KIT

BACKGROUND OF THE INVENTION

The present invention generally relates to rain gutters. More particularly, the present invention relates to a rain chain installation kit for coupling a rain chain to a rain gutter.

Rain gutters have been used for centuries to collect rainwater from a roof and direct it away from the building so as to prevent water damage to the walls, foundation, etc. of the building. In the past, rain gutters were made from stone, ceramic or wood. However, more modernly, rain gutters are typically comprised of a vinyl plastic material or of several different metals, including aluminum, galvanized steel, stainless steel, and copper.

Sections of rain gutter are connected to one another around the outer and lower peripheral edge of a roof so as to collect rainwater therein. An elongated tube, referred to as a downspout, extends from the drain aperture to the ground so as to direct the collected water away from the building.

Rain chains have become a popular alternative to the traditional elongated tubular downspouts of gutter systems. Rain chains are typically either in a series of durable decorative metal cups, chained together with a hole in the bottom of each, or chain links that span vertically. Their purpose is largely functional, although there are decorative aspects of the rain chain as well. Functionally, rain chains control and direct rainwater from the gutter downward toward the ground, away from the building structure so as to avoid water damage.

Unlike a downspout, rain chains make cascading water visible through or over the links, cups, loops and the like. Many people view rain chains as a beautiful and functional alternative to traditional downspouts and find the sound and sight of flowing water through and over the rain chain soothing. Cup styles tend to offer more of a tinkling sound than the link styles. Link styles can be hung in a single strand of chain links or in multiples for a unique look. Rain chains eliminate the disruptive, clunky noise associated with closed downspouts. Without a downspout or rain chain, there would be erosion of the ground underneath the gutter drain aperture, and there could be water damage to the structure over time.

Rain chains must be installed to the existing gutter so that the rain chains hang from the drain aperture where the downspout was. Attachment members, installation kits and the like are known in the industry for hanging the rain chains from the gutter. However, these have various drawbacks.

Some gutters have a drain aperture only, with no flange or spout to attach the rain chain. It has been found that water tends to swirl out of the aperture, missing the rain chain. Water may also stick to the underside of the gutter, dripping off the gutter up to several feet away from the rain chain. Some gutters have an opening that is larger than the rain chain's link or cup, and in this case much of the water will miss the rain chain at the top. In other instances, a bolt is used to attach the rain chain to the rain gutter. However, the installer must be careful to center or appropriately place the rain chain with respect to the rain gutter drain aperture such that the discharged rainwater will travel down the rain chain. Even when properly installed, it is possible that strong winds, people, animals or other objects may contact and move the rain chain, causing the rain chain to move off of its center point on the bolt, resulting in rainwater not being directed centrally down the rain chain or in rainwater missing the rain chain entirely, avoiding the purpose and benefits of the rain chain.

Accordingly, there is a continuing need for a rain chain installation kit which enables an installer to easily and effectively attach a rain chain to a rain gutter and appropriately position the rain chain with respect to the drain aperture of the rain gutter such that rainwater discharged therefrom will travel down the rain chain as intended. The present invention fulfills these needs and provides other related advantages.

SUMMARY OF THE INVENTION

The present invention relates to a rain chain installation kit for installing a rain chain to a rain gutter and properly positioning the rain chain with respect to a drain aperture of the rain gutter.

The rain chain installation kit generally comprises a gutter attachment unit comprising an outlet tube extendable through a drain aperture of a rain gutter. The outlet tube may be generally cylindrical. The outlet tube may also be tapered toward a discharge end thereof.

The gutter attachment unit further comprises a flange attached through the outlet tube and configured to rest within the gutter. The outlet tube and the flange may be integrally formed with one another.

A rain chain support is attached to the gutter attachment unit and has a sloped member that aligns a rain chain coupled thereto with the outlet tube. The opposite ends of the sloped member may be attached to or associated with the gutter attachment unit. The sloped member may extend below an open discharge end of the outlet tube. The sloped member may extend from a pin attached to the outlet tube. Typically, generally opposite ends of the sloped member are connected to the pin. The sloped member may be pivotally attached to the pin. One end of the sloped member may be detachably connected to the pin. The sloped member may comprise a curved or angled wire. The sloped member is curved or angled to a lower portion that supports the rain chain intermediate the ends of the support member.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings, for purposes of illustration, the present invention resides in a rain chain installation kit. The rain chain installation kit, as more fully described below, is easily attached to a gutter, and allows rain chains to be easily installed and removed, while self-centering the rain chains with respect to a rainwater outlet.

Figure 1:
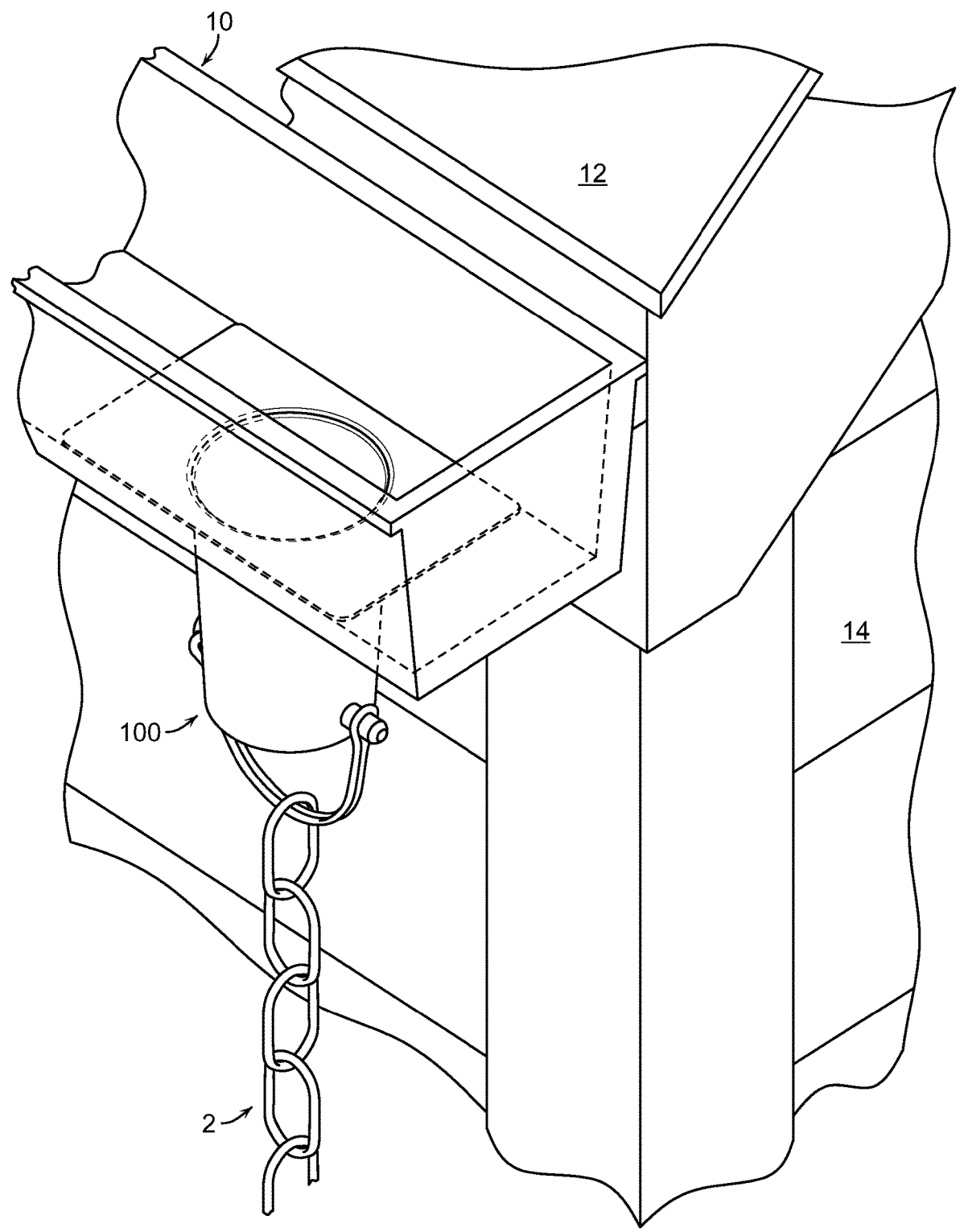
FIG. 1 is a partial perspective view of a rain chain installation kit embodying the present invention installed in a rain gutter and supporting a rain chain, in accordance with the present invention.

With reference now to FIG. 1, a gutter 10 is illustrated positioned with respect to a roof 12 of a building 14 so as to capture rainwater that falls from the roof 12 so as to direct it away from the building 14, such as the walls and foundation of the building 14. A rain chain installation kit 100 embodying the present invention is illustrated disposed within the gutter 10 and having a rain chain 2 coupled thereto.

In accordance with the present invention, as rainwater falls from the roof 12 and into the gutter 10, the water is directed to the installation kit 100, which discharges the water onto the rain chain 2 which is aligned with an outlet of the installation kit 100 such that the discharged rainwater will cascade down the rain chain 2. It will be understood that while a simple linkage rain chain 2 is illustrated herein, rain chains come in a variety of styles including various sized and types of links, such as chains, interconnected cups, loops, etc. Any of these styles and configurations of rain chains can be used in association with the installation kit 100 of the present invention.

Figure 2:
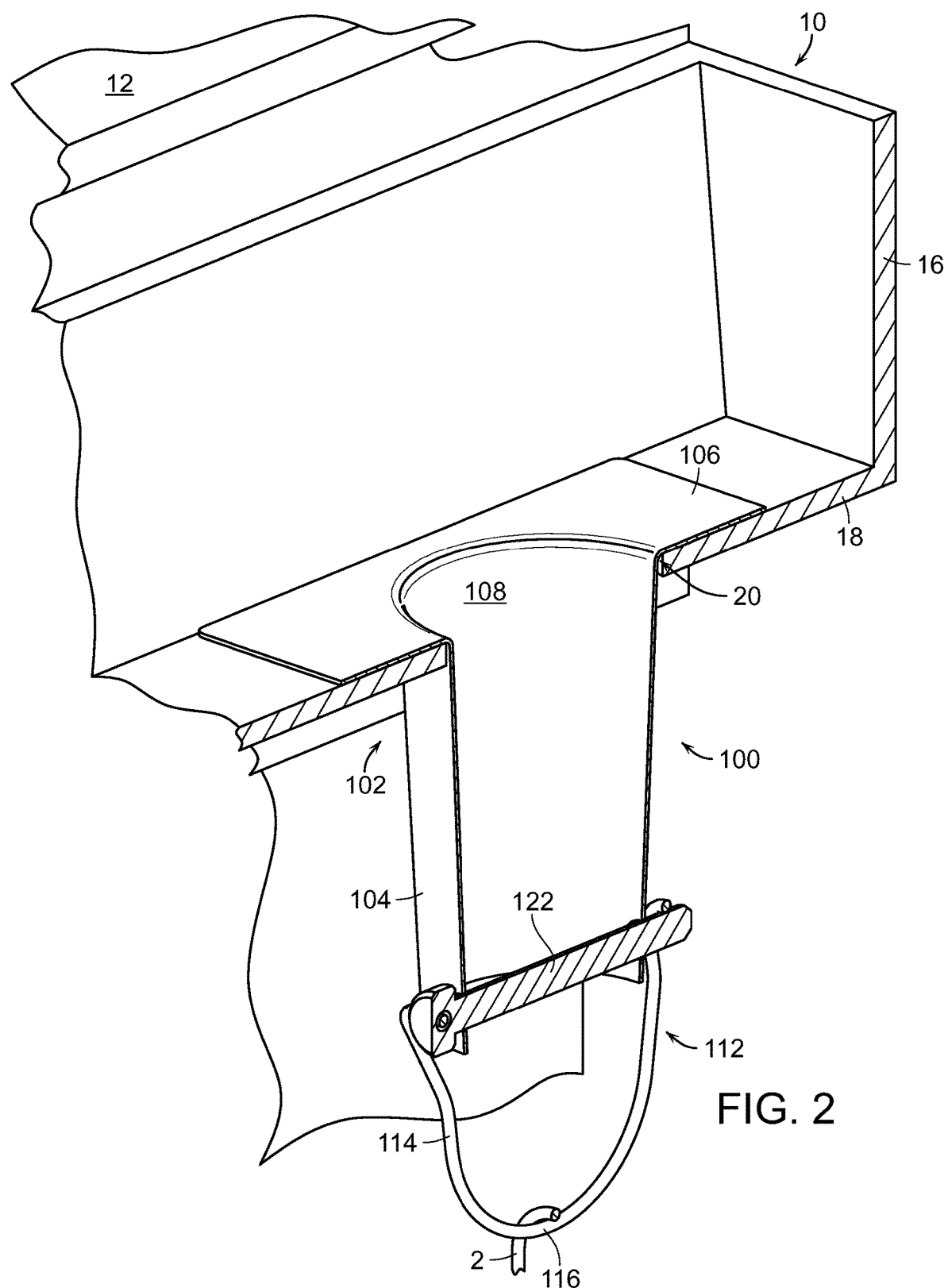
FIG. 2 is a partially sectioned perspective view of a rain chain installation kit embodying the present invention having an outlet tube thereof extending through a drain aperture of the rain gutter.
Figure 3:
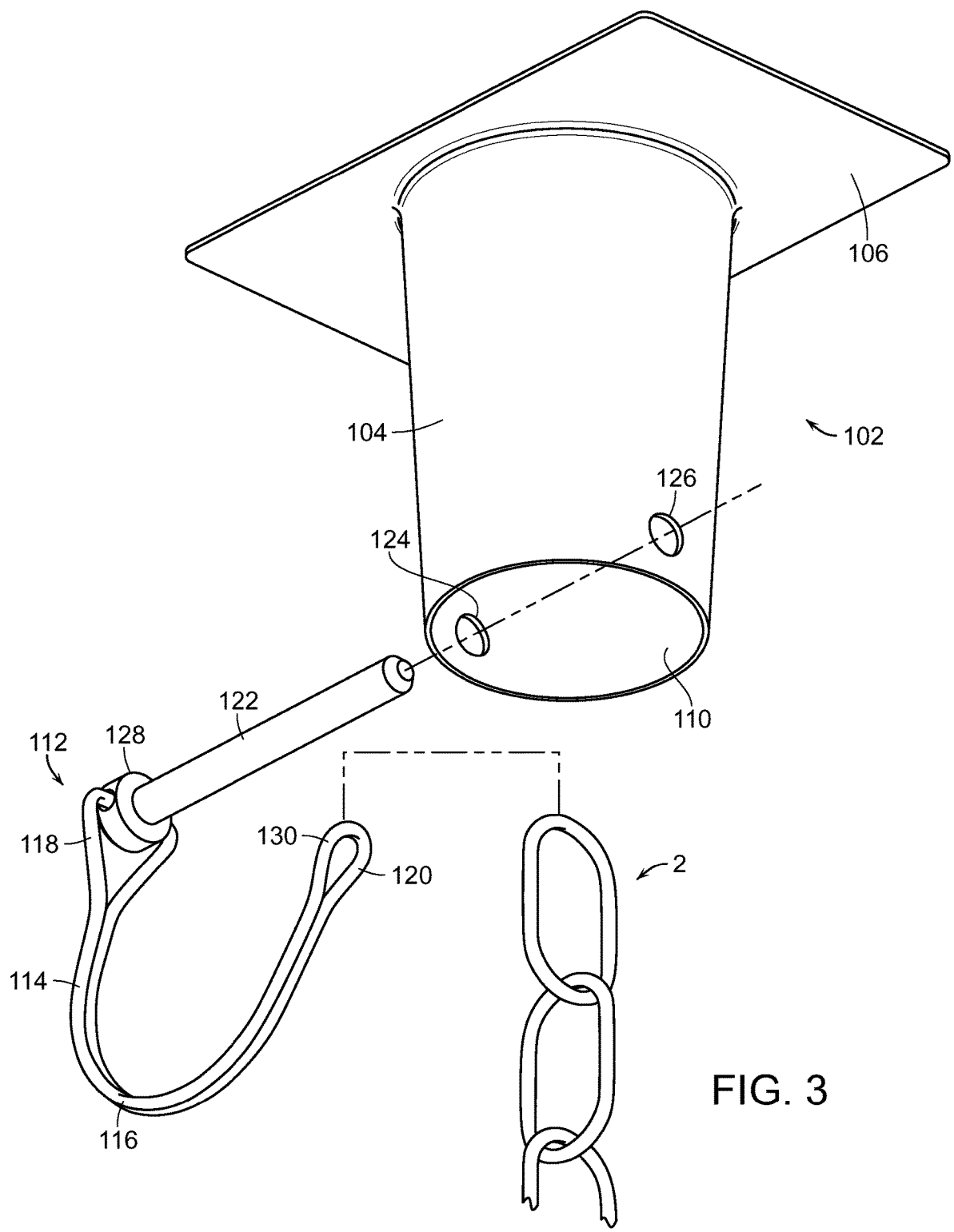
FIG. 3 is an exploded perspective view of component parts of the rain chain installation kit of the present invention and illustrating an attachment of a rain chain link to a sloped member of the installation kit.

With reference now to FIG. 2, a partially sectioned view of a gutter 10 and the installation kit 100 of the present invention is shown. As is well known, a gutter 10 has generally vertical side walls 16 extending upwardly from a base wall 18 so as to create an open-topped trough, which accepts the rainwater from the roof 12 such that the rainwater accumulates and is directed to a drain aperture 20. Conventionally, an elongated tubular downspout is connected to the drain aperture 20 so as to direct the rainwater toward the ground and away from the building in a controlled manner. However, when using a rain chain instead of a downspout, the rainwater is directed onto the rain chain such that the water cascades down the rain chain in an appealing manner and toward the ground surface. However, as explained above, the rain chain must be connected or associated with the gutter 10 in such a manner so as to have the rainwater directed onto the rain chain.

With reference now to FIGS. 2-5, the installation kit 100 of the present invention comprises a gutter attachment unit 102, which is coupled to the gutter 10 such that an outlet tube 104 thereof extends through or is otherwise aligned with the drain aperture 20 of the rain gutter 10. The gutter attachment unit 102 also includes a flange 106, which extends from the outlet tube 104 so as to hold the outlet tube 104 with respect to the gutter 10. Typically, the flange 106 rests upon the base wall 18 of the gutter 10. While the gutter base wall 18 and flange 106 are illustrated as being generally flat or planar, it will be understood that some gutter base walls 18 have a curved or rounded configuration, and thus the flange 106 may be curved or otherwise configured so as to fit and rest within the gutter 10 against the base wall 18 and/or side wall 16 thereof. While the gutter attachment unit 102 may simply be inserted within the gutter 10 such that the outlet tube 104 extends downwardly from the gutter drain aperture 20, the gutter attachment unit 102 may also be attached to the gutter 10. This may be by use of adhesive, such as a silicone adhesive or the like, which creates a seal between the gutter 10 and the gutter attachment unit 102, and more particularly the flange 106, such that water cannot flow under the flange 106 and out the discharge outlet 20.

Typically, the outlet tube 104 is generally cylindrical in shape. Preferably, the outlet tube is tapered along the length thereof between a water inlet 108 open end thereof toward a discharge end or outlet 110 thereof. This facilitates directing the rainwater toward the underlying rain chain 2. While the outlet tube 104 and flange 106 may be comprised of two separate pieces operably connected or attached to one another, the outlet tube 104 and flange 106 may also be integrally formed with one another as a single piece. Typically, the gutter attachment unit 102 is comprised of a metal or metal alloy, such as copper, bronze, aluminum, steel or the like. However, the gutter attachment unit 102, and installation kit 100 can be comprised of any suitable material.

With continuing reference to FIGS. 2-5, a rain chain support 112 is attached to the gutter attachment unit 102 so as to couple and position a rain chain 2 with respect to the outlet tube 104 of the gutter attachment unit 102. The rain chain support 112 includes a sloped member 114, which is attached to or associated with the gutter attachment unit 102. The sloped member 114 is curved or angled to a lower portion 116 intermediate the ends 118 and 120. This lower portion 116, when the installation kit 100 is installed, is generally centered or aligned with the outlet tube 104, and more particularly the discharge outlet end 110 of the outlet tube 104. Typically, the sloped member 114 extends below the open discharged end or outlet 110 of the outlet tube 104, as illustrated so that the water discharged from the outlet tube 104 will fall onto the sloped member 114, and particularly the lower portion 116 of the sloped member 114. However, the invention contemplates that the sloped member 114 could be installed within the outlet tube 104 to achieve the purposes of the invention.

Figure 6:
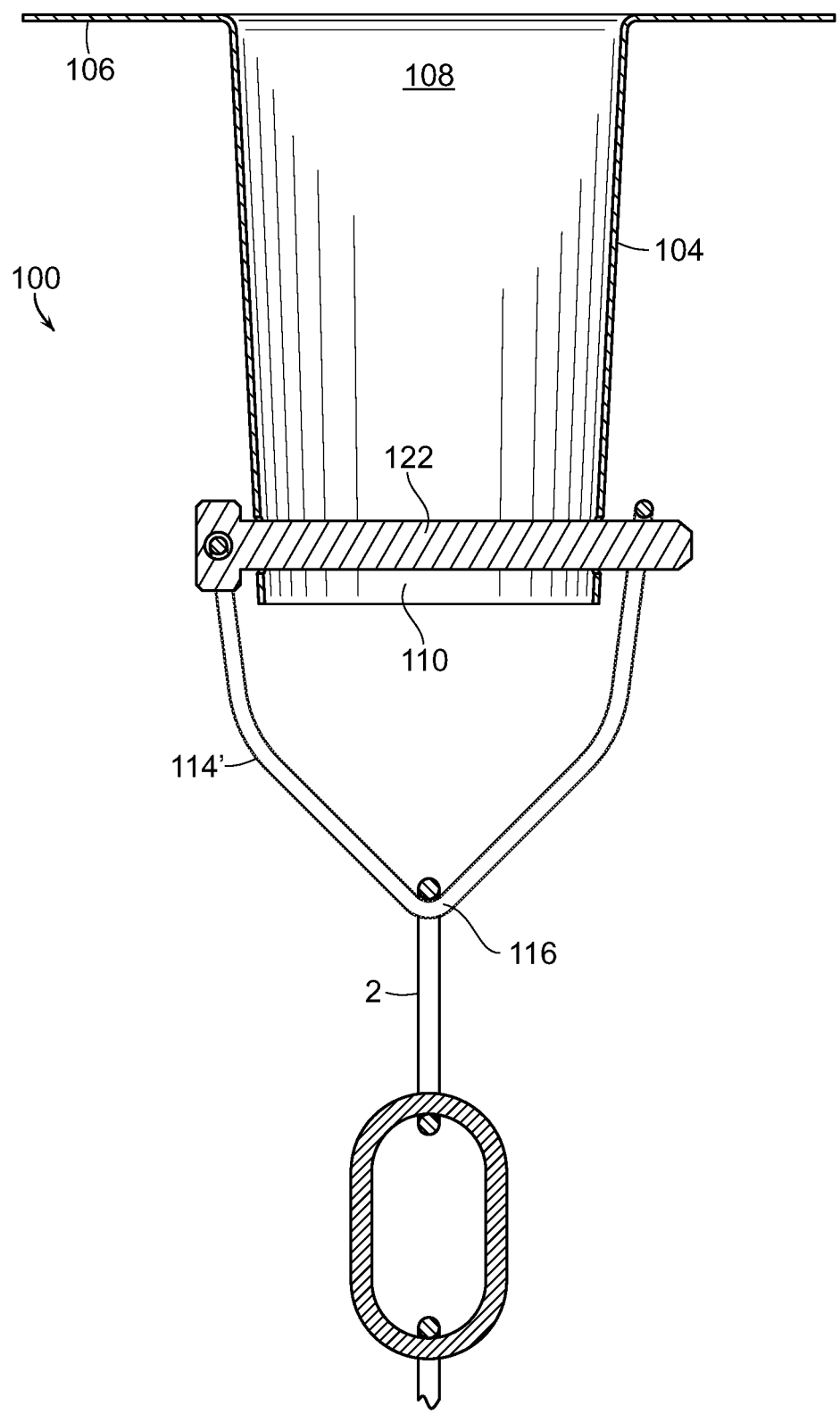
FIG. 6 is a cross-sectional view similar to FIG. 5, and illustrating a sloped member of a different configuration embodying the present invention.

The sloped member 114 can comprise a curved or angled wire or rod, as illustrated. The sloped member 114 is typically curved or semi-circular, such as having a generally D-shaped configuration as illustrated, although other configurations are contemplated by the present invention such as the sloped member 114' of FIG. 6, which is angled so as to terminate to a lower portion 116. The sloped member 114 is preferably configured such that an attached link of a rain chain 2 will slide down the sloped member 114 until it reaches the lower portion 116 so as to self-align or self-center with respect to the outlet tube 104, and more particularly the discharge end or outlet 110 of the outlet tube 104, or the generally longitudinal center axis of the outlet tube 104, such that rainwater discharged therefrom will fall onto the rain chain 2. As such, the sloped member 114 is curved or angled from the ends 118 and 120 thereof toward a lower portion 116 such that the rain chain 2 will self-center at the lower portion 116. Such configurations can include a D-shaped configuration, a C-shaped configuration, a V-shaped configuration, a U-shaped configuration or any other curved or angled configurations in which the rain chain 2 will rest at the lower portion 116 and self-center or become aligned with the outlet tube 104 of the gutter attachment unit 102.

Figure 4:
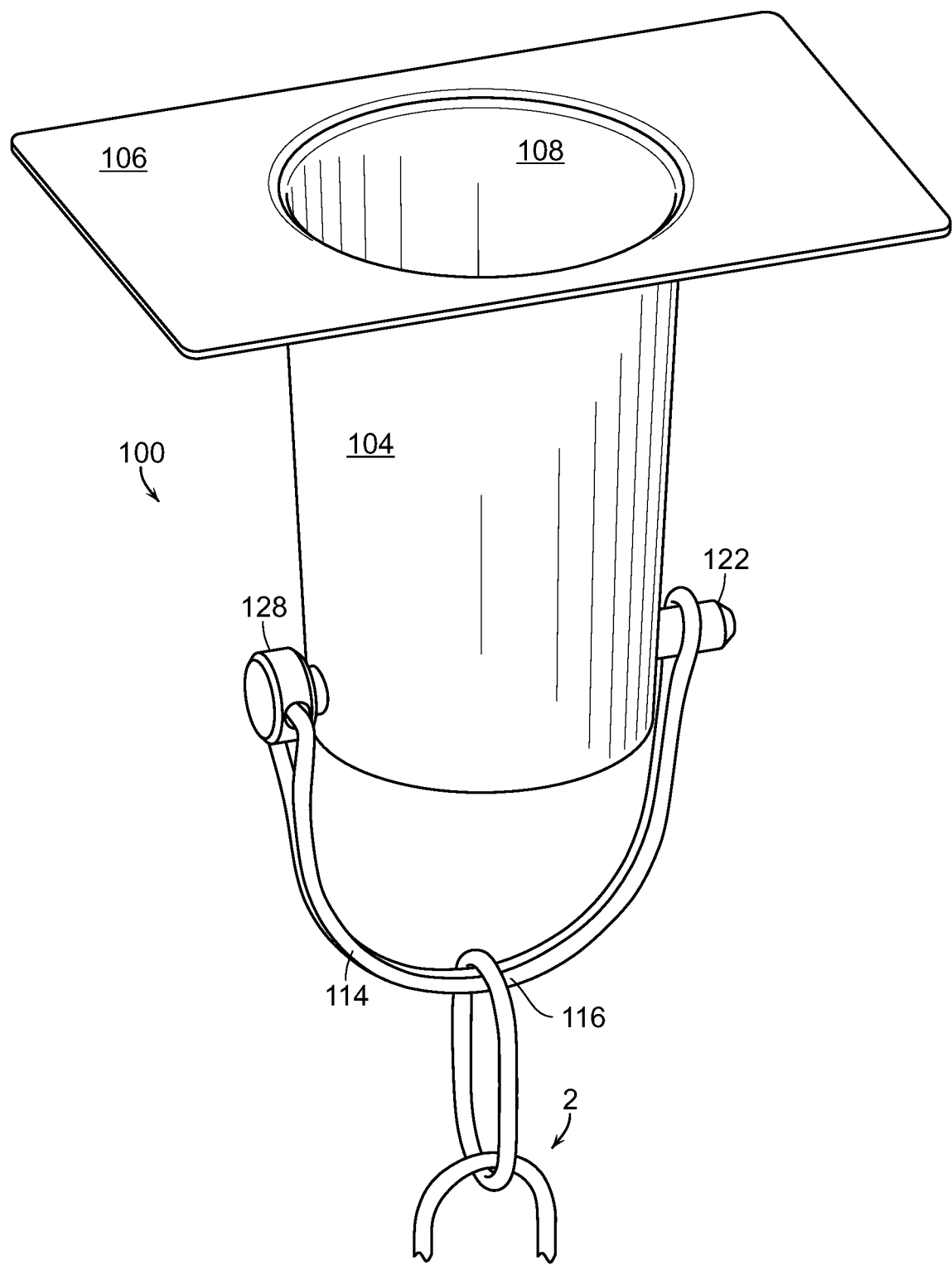
FIG. 4 is a side perspective view of a rain chain installation kit supporting a rain chain, in accordance with the present invention.
Figure 5:
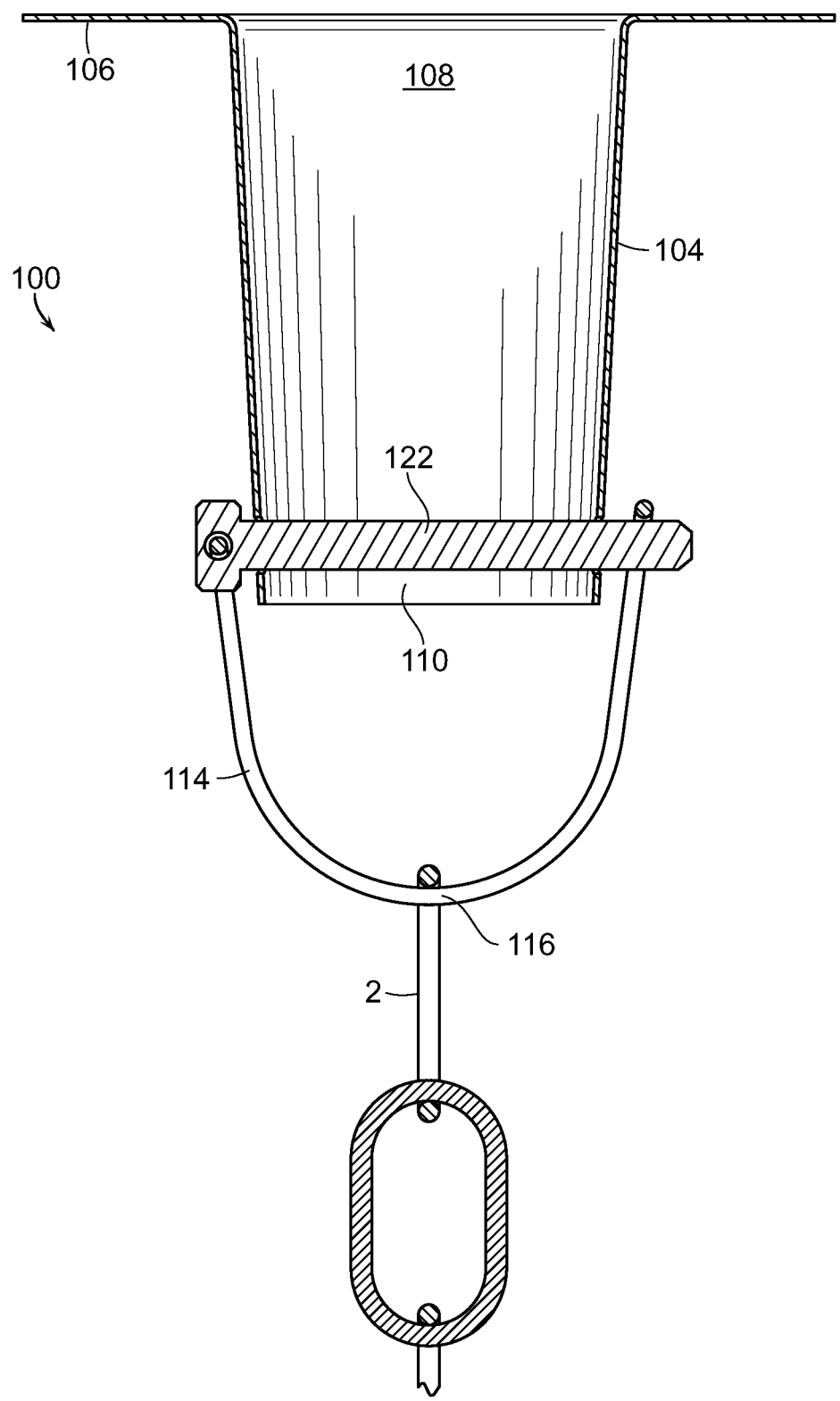
FIG. 5 is a cross-sectional view similar to FIG. 4.

The sloped member 114 is typically connected to a pin 122, which is connected to the outlet tube 104, which cooperatively form the rain chain support 112. For example, generally aligned apertures 124 and 126 may be formed in the outlet tube 104, such as toward a lower end thereof, as illustrated, through which the pin 122 is inserted so as to attach the rain chain support 112 to the gutter attachment unit 102. The generally opposite ends 118 and 120 of the sloped member 114 are attached to the pin 122. By way of example, end 118 may be attached to a head 128 of the locking pin 122. The opposite end 120 of the sloped member 114 may have a hook 130 or a generally circular end, as illustrated, which can snap-fit onto the generally opposite end of the locking pin 122, as illustrated in FIG. 4.

The sloped member 114 may be pivotally attached to the locking pin 122. Preferably, the sloped member 114 would be freely pivoting so as to come at rest generally in alignment with the outlet 110 of the outlet tube 104, as illustrated.

End 120 of the sloped member 114 is detachably connected to the locking pin 122, such that a link or attachment member of the rain chain 2 can be inserted over the end 120 of the sloped member 114 so as to be coupled thereto and self-center at the lower portion 116, as described above. This enables easy installation of the rain chain 2, and enables the installer to substitute one rain chain for another in a quick and easy manner.

The present invention enables an installer to easily remove or substitute a conventional tubular gutter downspout with the installation kit 100 of the present invention such that a rain chain 2 may be coupled to the sloped member 114 thereof and become aligned and self-center with respect to the discharge end or outlet of the outlet tube 104 of the gutter attachment unit 102, such that rainwater is directed onto the rain chain 2, and cascade downwardly thereon toward the ground. If the rain chain 2 were to be moved, such as due to high winds, an individual, animal or other object moving the rain chain 2, the rain chain would again become self-centered on the curved or angled sloped member 114 so as to be in alignment with the discharge end of the outlet tube 104.

Although several embodiments have been described in detail for purposes of illustration, various modifications may be made without departing from the scope and spirit of the invention. Accordingly, the invention is not to be limited, except as by the appended claims.

What is claimed is:

1. A rain chain installation kit that couples a rain chain to a rain gutter, comprising:
    a gutter attachment unit attachable to a rain gutter such that an outlet tube of the gutter attachment unit extends through or is aligned with a drain aperture of the rain gutter; and
    a rain chain support attached to the outlet tube, the rain chain support including a pin attached to the outlet tube and a sloped member having a first end connected to the pin and a second end detachably connected to the pin, the sloped member being sloped downwardly to a lower portion intermediate and below the first and second ends of the sloped member, the lower portion being aligned with an outlet of the outlet tube;
    wherein a rain chain slidably connected to the sloped member slides to the lower portion of the sloped member and self-aligns below the outlet of the outlet tube.

2. The kit of claim 1, wherein the outlet tube is generally cylindrical.

3. The kit of claim 2, wherein the outlet tube is tapered towards a discharge end thereof.

4. The kit of claim 1, wherein the gutter attachment unit further comprises a flange extending outwardly from the outlet tube that is configured to rest within the gutter and support the gutter attachment unit to the clutter.

5. The kit of claim 4, wherein the flange is an elongated planar or curved plate that rests on a base wall of the gutter.

6. The kit of claim 1, wherein the sloped member extends below an open discharge end of the outlet tube.

7. The kit of claim 1, wherein the sloped member comprises a curved or angled wire.

8. The kit of claim 1, wherein the pin extends horizontally across a width of the outlet tube.

9. The kit of claim 1, wherein the sloped member is pivotally attached to the pin.

10. The kit of claim 1, wherein the first end of the sloped member is of a circular or a hook configuration so as to be detachably placed over an end of the pin.

11. A rain chain installation kit that couples a rain chain to the rain gutter, comprising:
    a gutter attachment unit attachable to a rain gutter, the gutter attachment unit comprising an outlet tube extendible through or aligned with a drain aperture of the rain gutter and a flange extending from the outlet tube to rest on a base wall of the rain gutter for supporting the gutter attachment unit to the rain gutter; and
    a rain chain support comprising a pin attached to the outlet tube and a sloped member having a first end connected to an end of the pin and a second end having a circular or hook configuration for detachable placement over an opposite end of the pin, the sloped member being sloped downwardly to a lower portion intermediate and below the first and second ends of the sloped member, the lower portion being aligned with an outlet of the outlet tube;
    wherein a rain chain slidably connected to the sloped member slides to the lower portion of the sloped member and self-aligns with an outlet of the outlet tube.

12. The kit of claim 11, wherein the outlet tube is generally cylindrical and tapered towards a discharge end thereof.

13. The kit of claim 11, wherein the outlet tube and flange are integrally formed with one another.

14. The kit of claim 11, wherein the sloped member extends below an open discharge end of the outlet tube.

15. The kit of claim 11, wherein the pin extends horizontally across a width of the outlet tube.

16. The kit of claim 11, wherein the sloped member is pivotally attached to the pin.

17. The kit of claim 11, wherein the sloped member comprises a wire or rod that is curved or angled to the lower portion that supports the rain chain intermediate the ends of the support member.

18. The kit of claim 11, wherein the flange comprises an elongated planar or curved plate.

* * * * *